Oct. 28, 1930.  J. M. CRAIGO  1,780,117
DENTAL TOOL
Filed Sept. 1, 1928

Inventor
John M. Craigo
By K. Clay Lindsey
His Attorney

Patented Oct. 28, 1930

1,780,117

UNITED STATES PATENT OFFICE

JOHN MOORE CRAIGO, OF HARTFORD, CONNECTICUT

DENTAL TOOL

Application filed September 1, 1928. Serial No. 303,576.

My invention relates to that type of dental tools more particularly employed in the formation of devices to be attached to the teeth, and for other purposes, and an object of my invention, among others, is the production of a tool that is simple in construction, efficient in operation, and that is particularly convenient for the purposes for which it is designed.

One form of my improved tool in the construction and use of which the objects herein set out, as well as others, may be attained, is illustrated in the accompanying drawings, in which—

Figure 1:
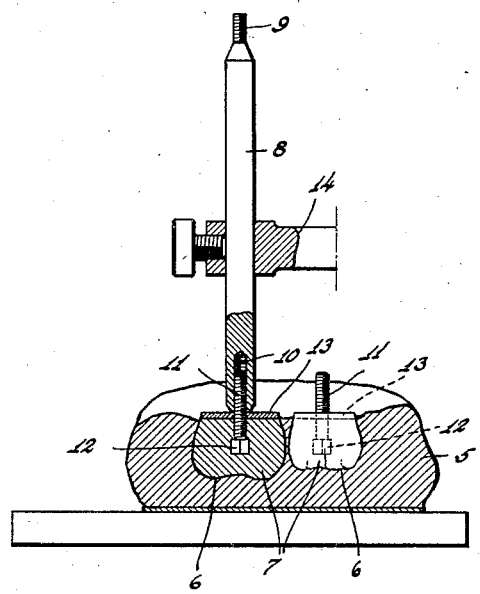
Figure 1 is a view illustrating a portion of my improved instrument and its manner of use, with parts broken away to show construction.

It is necessary in many dental operations to attach artificial teeth or devices relating thereto, or other structures, to permanent teeth, and in such operations it is common practice to make a mechanical duplicate of a portion of the natural jaw including the teeth, to which the mechanical devices in the form of teeth or otherwise, are to be attached. It is further common practice in such operations to make the teeth of the artificial jaw removable as a convenience in fitting devices to them.

My invention illustrated and described herein embodies a tool that is extremely useful in the operations hereinbefore set forth.

In the accompanying drawings the numeral 5 denotes a cast of plaster or other material that is obtained directly from the natural jaw and which contains cavities 6 formed by the teeth of the natural jaw and therefore, of the same shape as such natural teeth. In order to obtain artificial teeth that are counterparts of the natural teeth and to which artificial teeth devices may be fitted for eventual attachment to the natural teeth, the cavities 6 are stopped off with the exception of one cavity, and molten metal is poured into the cavity thereby forming an artificial tooth 7, and it is at this period in the operations and subsequently that this improved tool comes into use. Such tool comprises a handle 8, preferably of metal having a screw threaded pin 9 at one end and a screw threaded socket 10 at its opposite end.

A screw threaded coupling stud 11 is formed to fit the socket 10, this coupling stud having an enlarged head 12, preferably of angular shape and a positioning disc 13 is made to fit said stud.

In the use of the tool thus far described the positioning disc 13 is placed upon the coupling stud 11 at a point to determine the length of the stud to be located in an artificial tooth, this being governed by the size of the tooth. The handle 8 is then attached to the projecting end of the coupling stud and said handle is placed in a parallelometer, a portion 14 of which is shown in Figure 1 of the drawings. By means of the parallelometer the stud 11 is inserted in the molten metal, hereinbefore referred to, which metal is permitted to harden. The handle 8 may now be removed from the parallelometer and by means of the tool the tooth may be removed from the cavity 6 in the cast or mold 5.

This improved tool also comprises a dowel 15, preferably of tapered form and which may have a flattened portion 16 on one side, or it may be provided with other means for preventing turning movement in a cast within which it may be inserted. This dowel has a threaded socket at each end formed to fit the coupling stud 11 and pin 9. These sockets are each preferably in the form of a hole 17 extending completely through the dowel.

Figure 2:
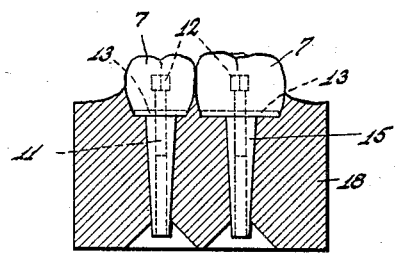
Figure 2 is a view of another portion of my improved instrument showing its manner of use, with parts broken away to show construction.
Figure 3:
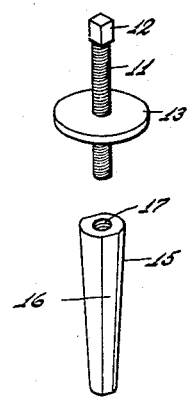
Figure 3 is a perspective view, scale enlarged, of that portion of the instrument shown in Figure 2.

In further operations the dowel 15 is attached to the threaded stud 11 and it now serves as a means for anchoring a tooth 7 within a cast 18 of plaster Paris or other suitable material, as shown in Figure 2 of the drawing and which is formed in any common manner well known to those skilled in the art and, as to the tooth bearing portion at least, being a counterpart of a human jaw. A counterpart of a human jaw is obtained that is employed as a pattern for fitting thereto such devices as may be desired and when so fitted such parts will accurately fit the human jaw of which the artificial jaw shown in Figure 2 is a counterpart.

Figure 4:
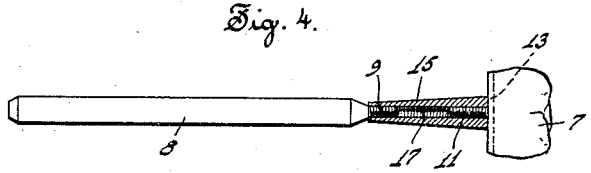
Figure 4 is a side view of my improved instrument complete, illustrating its manner of use and with parts cut in section to show construction.

If it be desired to use a tooth separated from the cast 18, and for any purpose, such tooth with its dowel may be removed from the cast and the handle 8 may be affixed in one end of the hole 17, and as shown in Figure 4 of the drawings.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A dental instrument including a coupling stud having means at one end for attachment to a tooth or similar article, and a dowel removably attachable to said stud at its opposite end to support said tooth.

2. A dental instrument including a coupling stud having means at one end for attachment of a tooth or similar article and screw threaded at its opposite end, a dowel screw threaded to fit the thread on said stud, and a handle having a screw thread to fit that on said dowel for support of the latter.

3. A dental instrument including a threaded coupling stud having a head at one end for attachment to a tooth, and a dowel longitudinally tapered and adapted to be removably fitted in a correspondingly shaped recess in a plaster cast, said dowel having an axial recess provided with an internal thread complementary to, so as to receive, the thread of said stud.

4. A dental instrument including a coupling stud screw-threaded at one end and having means at its opposite end for attachment to a tooth, and a longitudinally tapered dowel having an opening extending from one end of the dowel to the other, said opening having an internal thread adapted to receive the thread of said stud, said dowel being non-circular in cross-section to prevent it from rotating in the recess in which it is adapted to be removably fitted.

JOHN M. CRAIGO.